United States Patent [19]

Rosenberg

[11] 4,187,182
[45] Feb. 5, 1980

[54] BOX FILTER

[75] Inventor: David J. Rosenberg, Glen Cove, N.Y.

[73] Assignee: Pall Corporation, Glen Cove, N.Y.

[21] Appl. No.: 926,767

[22] Filed: Jul. 21, 1978

[51] Int. Cl.² .............................................. B01D 27/08
[52] U.S. Cl. ...................................... 210/445; 55/497;
55/514; 55/DIG. 31; 210/446; 210/451;
210/493 FR; 210/DIG. 23
[58] Field of Search ............ 210/493 R, 493 FR, 447,
210/507, 508, 446, 445, 451, 484, 473, DIG. 23;
55/521, 497, 510, DIG. 31, 514, 503

[56] References Cited
U.S. PATENT DOCUMENTS

| | | | |
|---|---|---|---|
| 3,138,443 | 6/1964 | Engle et al. | 210/493 R |
| 3,815,754 | 6/1974 | Rosenberg | 210/493 R |

Primary Examiner—Frank Sever

[57] ABSTRACT

A disposable box filter is provided comprising a box housing in at least two portions and having a fluid chamber with two fluid ports, and a filter element in corrugated sheet form extending across the fluid chamber, held by the housing across the line of flow between the fluid ports, with the corrugations supported in a fixed uniform spacing against differential fluid pressure and fluid flow.

16 Claims, 4 Drawing Figures

BOX FILTER

It is quite important in medical applications that a filter be capable of being made absolutely sterile before use. To avoid the necessity of complex cleaning and sterilizing operations after use, it is also desirable that the filter be disposable. The design of a filter element that is both sufficiently inexpensive to be disposable, and capable of being autoclaved for a sufficiently long time to render it absolutely sterile throughout, without effect upon the tightness of the fluid seals or distorting the fluid line connections, or changing the pore size of the filter element, is quite a challenge, that is not readily met. The design must, for example, be susceptible of mass quantity production at low cost, and be relatively foolproof from the standpoint of obtaining reliably fluid-tight and microorganism-tight seals. It is particularly important that these requirements be fully met in the case of filters for use in the filtration of blood and to control the administration of fluids or gases to a patient.

Also of considerable importance, although not a matter of necessity, is that the filter element be of a high flow capacity at a low pressure drop in a small compact size. This permits administration or circulation of fluids without excessive line pressures, and avoids the wasting of medical or body fluids in a hold-up in the filter after administration is complete. It also permits use of the filter in a system where only small volumes of fluids or gases are to be administered or serviced.

These requirements make it difficult to fabricate the filter, and particularly the housing, of metal parts, although the use of metallic filter elements is not precluded, partly because the cost of metals is rather high, and partly because they are more difficult and more costly to fabricate, particularly when the filter assembly is to be of a small size. However, when plastic parts are used, it is quite difficult to fabricate the filter in a manner such that the filter element will be securely and reliably sealed in the housing without any possibility of leakage of fluids or microorganisms past the filter, and can be autoclaved in the course of sterilization procedures without developing leaks. Moreover, the sealing of the filter element in the housing presents special problems, due to the difficulty of access to the filter element in the housing while the bonding and sealing operations are carried out.

In consequence, disposable filters have been fabricated of plastic, but the filter elements have been made in a tubular configuration, with the tube ends closed off by end caps, because such a complete filter structure with access past the filter element being blocked by the ends caps can be easily sealed in a plastic housing in a leak-tight manner. However, such a structure is relatively costly, because at least two operations, formation of the filter element and sealing the element in a housing, are necessary, and a third operation, fabrication of the housing, and sealing that, may also be required. To enclose the filter directly and inexpensively in a housing in a leak-tight manner has defied design, and such filters if made were not sufficiently inexpensive or reliable to be either disposable or suitable for medical applications.

Rosenberg U.S. Pat. No. 3,815,754, patented June 11, 1974, provides a disposable filter assembly in a box shape, in which the filter element is in corrugated sheet form, is held at its sides in the housing, and can be built into the housing in this way because it is accessible during the bonding operations. This design includes means for closing off the access openings in the housing in a manner to ensure a fluid-tight seal between the housing and all sides of the filter element, so as to preclude any possibility of leakage past the filter element within the housing. The design lends itself to the use of plastic in all parts of the filter assembly, optionally including even the filter element itself, and also makes it possible to integrate the component parts of the disposable filter assembly into as little as one piece. The filter assembly can be made in mass production in large quantities, at low cost, so that the assembly can be considered as truly disposable after one use.

The box design is however not suitable for use under relatively high fluid pressure differentials. The corrugations being unsupported except at their tips at one side of the box are prone to displacement distortion and even collapse upon each other, greatly reducing the available surface area and filter capacity, increasing pressure drop, reducing fluid flow, and expediting plugging, shortening the life of the filter. This problem is especially severe when fine-pored filter sheets are used, and when the filter sheets are of relatively weak material, such as filter membranes.

A further problem is the difficulty of sealing the side caps across the open sides of the box housing to the sides of the filter sheet. Since the corrugations are unsupported, they tend to become displaced when pressure is applied to the sides of the sheet, and can move away from the side caps during side capping. Also, the sides of all the corrugations must be absolutely true to size and straight, or there will be gaps between the caps and the sheet where there is any unevenness, increasing susceptibility to the development of leakage in use.

The disposable filter assembly in accordance with the invention comprises, in combination, a housing comprising first and second housing portions assembled in a generally box-like configuration having two ends and at least four opposed sides defining therebetween a fluid chamber and at least two fluid ports; having outer side walls along the ends and two opposed sides, and having two sides open, at least two inner side walls spaced from the outer side walls and extending along said opposed sides; and a filter element in corrugated sheet form extending across the fluid chamber across the line of fluid flow between the fluid ports and held in a fluid-tight seal extending the length of the inner side walls at opposed side portions of the filter element between an edge of the inner side walls and another portion of the housing; and side caps extending along the sides of the filter element and bonded in a fluid-tight seal thereto; comb means interdigitatedly inserted between corrugation folds having tynes of a width substantially equal to the spacing between corrugation folds, and a length substantially equal to the depth of the corrugation folds; the comb means, the side caps, and inner side walls and housing portion together holding the sides and corrugation folds of the filter element, positioning the filter element across the fluid chamber, supporting the folds against displacement in any direction, and sealing all the sides of the filter element to the housing, so that the fluid flow between the fluid ports must pass through the filter element.

In a preferred embodiment, the mating sections of the first and second housing portions engage and grip edge portions of opposed sides of the filter element. They can be integrated through the pores of the filter element in a fluid-tight seal, if desired, but this is unnecessary.

In a preferred embodiment, the disposable filter assembly is a box cube, and substantially square-sided. However, any type of box shape can be used.

In a preferred embodiment, the comb means is molded as an integral part of each housing portion. While a central comb means is in some cases sufficient, the comb means preferably is disposed both centrally and at each side of the housing portions, to engage the corrugation folds at their side ends, as well as at a central portion. The comb means can also be individually formed, and attached to or bonded to the housing portion.

Since the first and second housing portions are open at their sides during assembly, until the side caps are put on, there is complete access to the interior of the mating sections, to ensure that the corrugation folds are properly fitted over the comb tynes, and that a fluid-tight seal to the corresponding sides of the filter element is obtained when the mating sections thereof are bonded together. The sides of the filter element extending across the open sides are then closed off by side caps, which can be formed in situ, and bonded to the first and second housing portions across the openings. The sides of the filter element are easily sealed off by molding or potting the caps in situ using a hot-melt of a thermoplastic capping material. The result is that all sides of the filter element are sealed to the sides of the housing, on one set of opposed sides to the side caps, and on the other opposed sides to the first and second housing portions, so that all fluid flow between the fluid ports must pass through the filter element.

One preferred embodiment of the invention is shown in the drawings in which.

Figure 1:
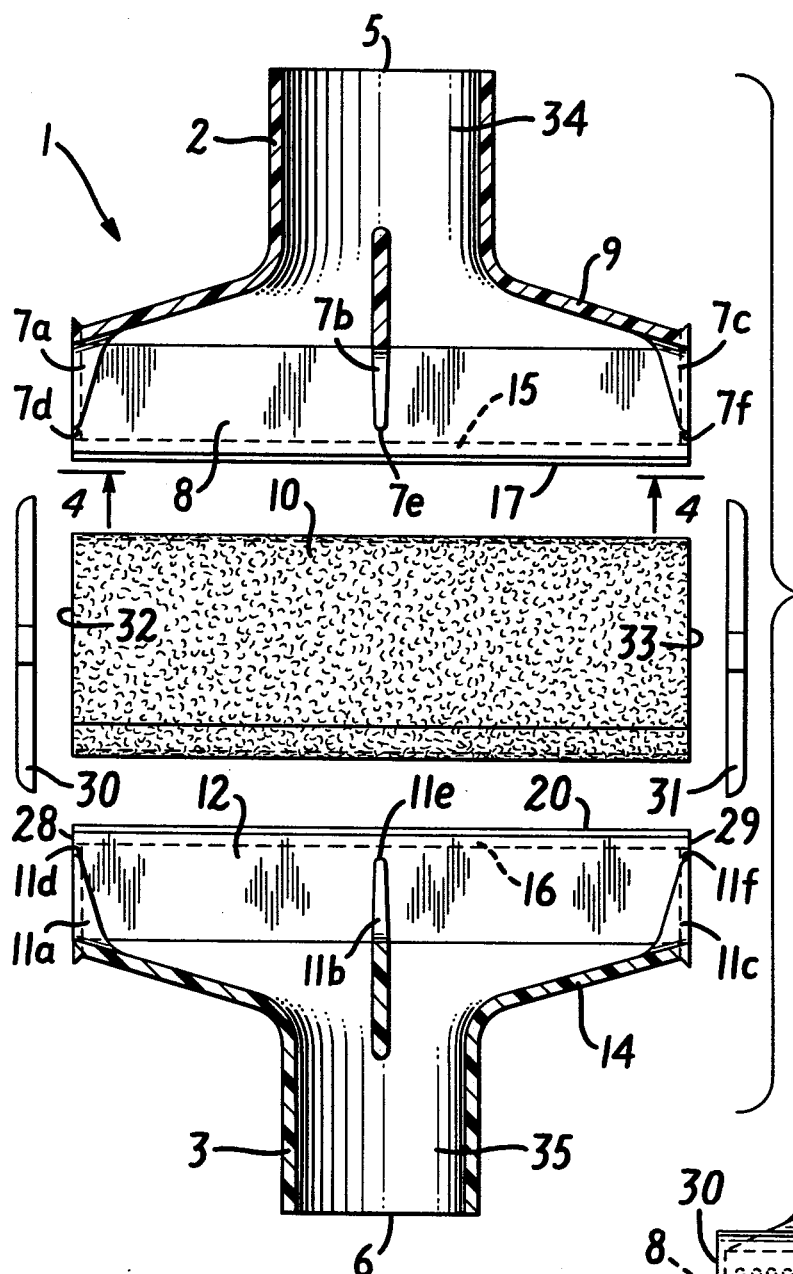
FIG. 1 represents an exploded view of a box filter in accordance with the invention, showing the component parts prior to assembly, including the two housing portions, the filter element in sheet form, the two side caps and the three combs.

The filter assembly of FIGS. 1 to 4 is composed of a molded plastic housing 1 having first and second housing portions 2 and 3 defining a fluid chamber 4 therewithin. A fluid port 5 is at the base of housing portion 2, and a fluid port 6 is at the base of housing portion 3. It will be seen that these ports are coaxial. One port serves as a fluid inlet and the other as a fluid outlet; fluid flow can be from either direction since the filter element 10 is a corrugated sheet whose opposite sides are the same. Housing portion 2 has as an integral molded part thereof three combs, 7a, 7b, 7c, having tynes 7d, 7e, 7f, and housing portion 3 has as an integral molded part thereof three combs 11a, 11b, 11c, having tynes 11d, 11e, 11f. These serve as supports extending between and spacing the corrugation folds of the filter sheet 10 serving as the filter element, disposed at the ends and center of the folds, and extending the depth of each fold, from the tip to the base.

Housing portion 2 has opposed sides 8 and 8' extending outwardly from the base portion 9, and housing portion 3 has opposed sides 12 and 13 extending outwardly from base portion 14. Each of sides 8, 8' of portion 2 terminates in an outwardly extending flange 15, and each of sides 12, 13 of portion 3 terminates in an outwardly extending flange 16. Each flange 15 has two sets of single ribs 17, 18, and each flange 16 has one single rib 19 and one double rib 20 with a slot 24 therebetween, into which ribs 17 fit. The sides of the filter element 10 are engaged by ribs 17, 20 and so retained in position. The ribs 18, 19 are bonded together to hold the housing portions together at the flanges 15, 16 as one piece. Such a bond can be obtained, for example, by ultrasonic welding, by solvent softening, or by heat-fusion. In this way two of the four sides of the filter element 10 are sealed to the side caps, and two are held in the bite between ribs 17, 20 of the housing parts. This closes off all four side edges of the filter sheet to fluid flow, and restricts flow between the two portions of the fluid chamber 4 in the housing to that via the pores of the filter element 10. Thus, all flow between the fluid ports 5 and 6 of the housing 1 must pass through the filter.

The filter element 10 can be of any filter sheet material. The element shown is made of microporous plastic membrane sheet, such as nylon, cellulose acetate or polypropylene membrane. Plastic or wire mesh, such as polyester mesh fabric, or stainless steel wire mesh, or epoxy-impregnated paper, or a supported nylon membrane, as well as other types of sheet filter elements, can also be used. The filter element is a square sheet, in corrugated form, for an increased surface area in the limited space of fluid chamber 4.

The assembly of the box filter of FIGS. 1 to 4 is as follows: It will be seen on reference to FIG. 1 that the side sections 8, 8', 12, 13 of each housing portion 2, 3 have a special construction which ensures a fluid-tight seal between the housing portions when they are bonded together. The flanges 15 of the opposed sides 8, 8' of housing portion 2 meet the flanges 16 of the sides 12, 13 of the other housing portion 3. Flanges 15 of portion 2 have one pair of ribs 17, 18 and flanges 16 of portion 3 have one set of single ribs 19 and one pair of ribs 20 receiving ribs 17 therebetween, to ensure that the portions 2, 3 fit snugly together in the correct position to hold the filter sheet 10 in place.

Figure 2:
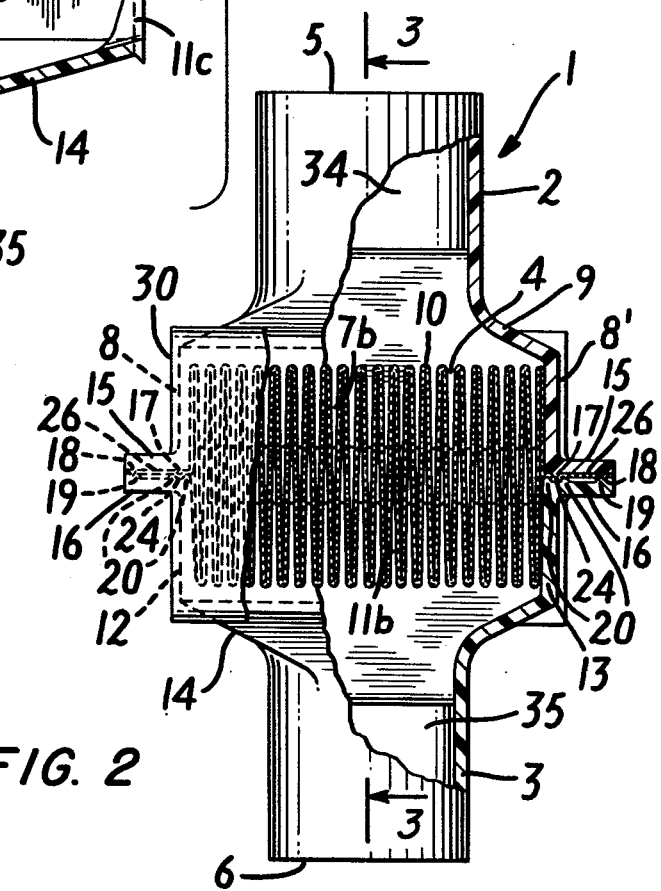
FIG. 2 represents a side view, partly in section, of the filter assembly of FIG. 1 taken along the line 2—2 and looking in the direction of the arrows.
Figure 3:
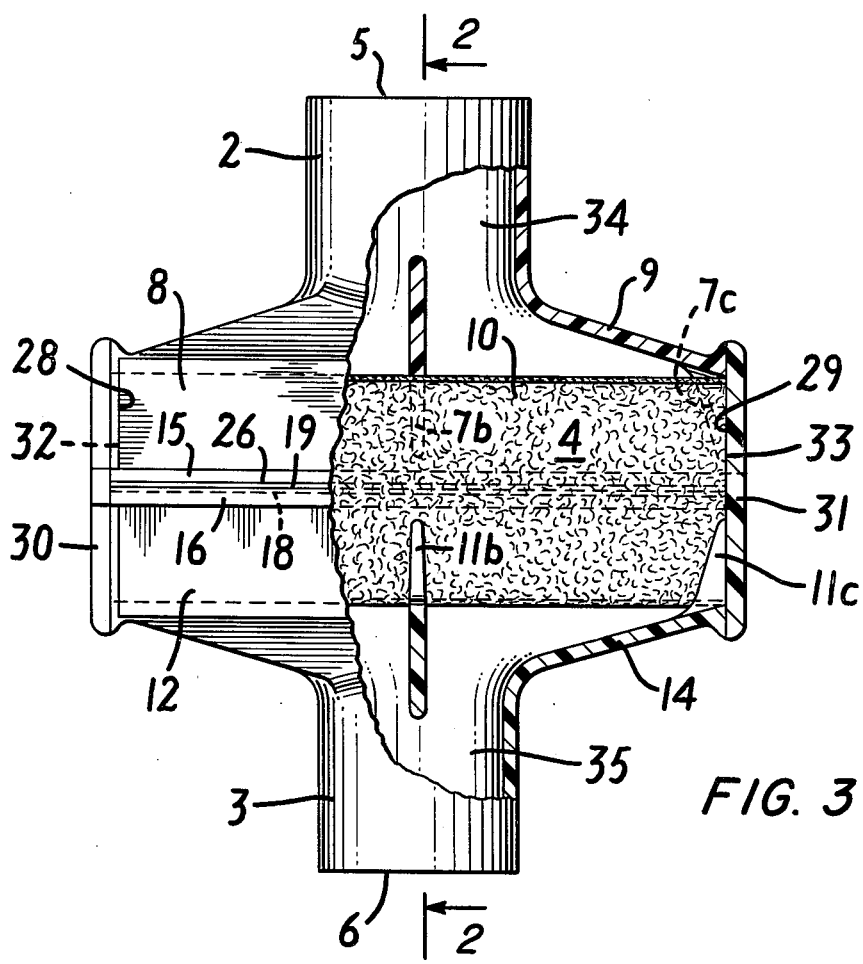
FIG. 3 represents another side view, partly in section, of the filter assembly of FIG. 1, taken along the line 3—3 and looking in the direction of the arrows.
Figure 4:
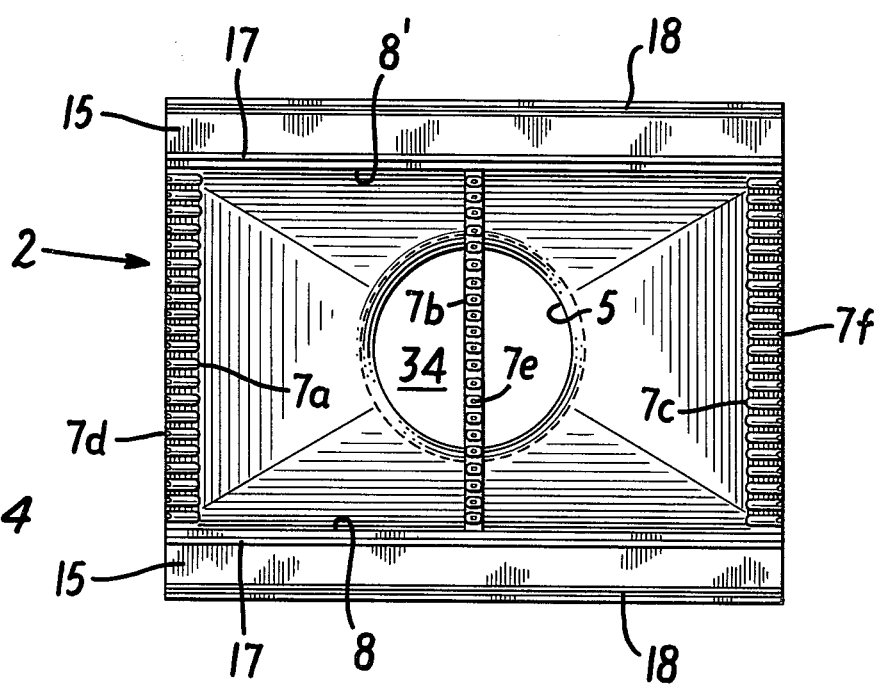
FIG. 4 represents an end side view of another embodiment of box filter assembly of the invention, looking into one housing portion of FIG. 1 along the line 4—4 in the direction of the arrows.

After portions 2 and 3 are fitted together, with ribs 17, 20 and 18, 19 abutting, the ribs 18, 19 are readily fused together to produce an integral one-piece structure at the seal 26 (FIGS. 2 and 3). Internally of the ribs 18, 19 are the ribs 17, 20, which retain the filter element sides in their bite.

In assembly, the corrugated filter element is placed in housing portion 3 with the edges lapped over the flanges 16 over the ribs 20, with the tynes 7d, 7e and 7f in the corrugation folds therebetween, as seen in FIG. 2. Housing portion 2 is then fitted over the portion 3, with the tynes 11d, 11e, and 11f fitting in the other side of the corrugation folds, and pressed down smartly against the filter sheet, pinching the sheet edges between the ribs 17, 20, holding the sheet firmly in place by the tight engagement between the flanges 15, 16 of the housing portions 2, 3 and the ribs 17, 20. The ribs 18, 19 are then integrated by ultrasonic welding, forming a fluid-tight seal therebetween, and closing off these two sides of the filter element to fluid flow.

Next, the side caps 30, 31 are formed in situ or preformed and bonded across the openings 28, 29 into the housing portions 2 and 3, and to the filter element edges 32, 33, bonding the filter element sides to the side caps, and completing the fixing of the four side edges of the filter element in place in the fluid chamber. This can be done using, for example, an adhesive or a melt of adhesive or resin, or a potting composition. The filter assembly is now complete, and ready for use.

The filter assembly is operated in-line, as follows: Fluid flow can be in either direction. Fluid enters at port 5, for example, and enters chamber portion 34, then flows through the filter 10 and enters chamber portion 35, whence it emerges from the housing 1 via port 6.

Line connections can be made at ports 5, 6 in any desired manner. For medical use, Luer-loks can be used.

While the combs 7a, 7b, 7c, 11a, 11b, 11c are shown as an integral part of the housing portions, and this is preferred, they can also be separately formed and inserted in slots or otherwise fitted to and attached to the housing portions. If fluid flow is to be only in one direction through the filter at all times, the combs can be restricted to the downstream side of the filter sheet.

The effect of combs upon pressure drop and flow rate is remarkable and entirely unexpected. In use in the filtration of gases, for example, the flow rates are approximately doubled, and the pressure drop cut in half. This effect cannot be attributed solely to the prevention of collapse of the corrugation folds one upon the other, but is evidently a function almost entirely of the uniformity in the spacing. The combs clearly fix a uniform spacing of the corrugated filter sheet in the box housing. Evidently, in the absence of combs, the filter corrugations assume a nonuniform spacing which has an adverse effect upon flow rate, the flow rate being slower in the narrower spaces and larger in the more open spaces. This may lead to turbulence and other unusual flow conditions, which may further inhibit flow.

The filter housing portions, combs if separate from the housing, and side caps can be made of any synthetic plastic material. Thermoplastic or solvent-soluble plastic materials are preferred because of the ease of bonding, but it is also possible to use thermosetting resins in a thermoplastic, fusible, or heat-softenable stage of polymerization, until the bondings have been effected, after which the curing of the resin can be completed to produce a structure which can no longer be separated. Such a structure is autoclavable without danger of destroying the fluid-tight seal between the housing portions and the filter element and the side caps and the filter element. Thermoplastic resins whose softening point is sufficiently high so that they are not softened under sterilizing autoclaving conditions are preferred for medical use. Exemplary of the plastic materials which can be used are polyethylene, polypropylene, polybutylene, polyisobutylene, polyamides, polyvinyl chloride, polyvinylidene chloride, polyacrylonitrile, polyesters, polycarbonates, polymethyl methacrylate, polyallyl, and polyoxymethylene resins. Polytetrafluoroethylene and polytrifluorochloroethylene can also be used.

Any filter element can be used, but it is usually preferred for medical purposes that the pore size of the filter element be less than 50 microns, and preferably less than 0.3 microns where the passage of bacteria through the filter assembly is to be prevented. Filter sheets which are incapable of passing bacteria include membrane filters and filter sheets described in U.S. Pat. Nos. 3,238,056, dated Mar. 1, 1966, 3,246,767, dated Apr. 19, 1966, 3,353,682, dated Nov. 21, 1967, and 3,573,158, dated Mar. 30, 1971, to Pall et al.

Also useful are metallic filter sheet materials, such as woven or nonwoven wire mesh, for instance, stainless steel screen, and stainless steel wire mats. Metal filter sheets are readily bonded to plastic housing materials in a fluid-tight seal by fusion or potting techniques, or by use of adhesives.

The disposable box filter assemblies of the invention can have any number of sides, conforming to the circumferential configuration of the filter sheet. The filter sheet is preferably square or rectangular, but it can be any straight-sided polygonal shape, including triangular, hexagonal, pentagonal, and octagonal. The housing embodiments shown in the drawings thus are four sided boxes for square or rectangular filter elements, and this is the simplest and the preferred configuration. However, pentagonal, hexagonal, heptagonal, and octagonal and higher polygonal box configurations are possible.

The disposable box filter assemblies of the invention have wide medical uses, and can be used, for example, in the filtration of blood, in blood transfusions, and in extracorporeal transfusion operations, where the blood must be circulated through a filter before being returned to the body. The filters can be used in lines administering fluids and gases of all sorts to a patient, such as, for example, a breathing filter to isolate the patient from an inhalation therapy apparatus, and in the filtering of fluids for intravenous administration, as well as any use where a small extended area disposable filter is needed with a substantial filter surface in a small space.

Having regard to the foregoing disclosure, the following is claimed as the inventive and patentable embodiments thereof:

1. A disposable filter assembly comprising, in combination, a housing in two mating housing portions of a generally box-like configuration having two ends and at least four opposed sides defining therebetween a fluid chamber and at least two fluid ports; having outer side walls along the ends and two opposed sides, and having two sides open, at least two inner side walls spaced from the outer side walls and extending along said opposed sides; a filter element in corrugated sheet form extending across the fluid chamber across the line of fluid flow between the fluid ports and held in a fluid-tight seal extending the length of the inner side walls at opposed side portions of the filter element between an edge of the inner side walls and another portion of the housing; and side caps bonded in a fluid-tight seal to the sides of the filter element extending along said sides; at least three spaced comb means integral with each housing portion and extending outwardly therefrom, the three comb means being evenly spaced with one comb means at each end and one approximately equidistant from each end of each housing portion, and interdigitatedly inserted between corrugation folds and between each other and having tynes of a width substantially equal to the spacing between corrugation folds, and a length substantially equal to one-half the depth of the corrugation folds; the comb means, the side caps, and inner side walls and housing portions together holding the sides and corrugation folds of the filter element and positioning the filter element across the fluid chamber, the comb means being so spaced as to support the folds against displacement in any direction, all the side edges of the filter element being sealed to the side caps and inner side walls of the housing, so that the fluid flow between the fluid ports must pass through the filter element.

2. A disposable filter assembly in accordance with claim 1, in which the housing is in two mating housing portions which engage and grip opposed sides of the filter element, and which are integrated in a fluid-tight seal.

3. A disposable filter assembly in accordance with claim 1, in which the housing is a rectangular box.

4. A disposable filter element in accordance with claim 1, in which there are only three comb means.

5. A disposable filter assembly in accordance with claim 1, wherein the housing is a box having four sides, two of the sides being defined by the side caps, and the filter element is in four-sided sheet form.

6. A disposable filter assembly in accordance with claim 1, in which the fluid ports are coaxial.

7. A disposable filter assembly in accordance with claim 1, in which the filter element has a pore size of less than 50 microns.

8. A disposable filter assembly in accordance with claim 1, in which the filter element has a pore size of less than 0.3 micron.

9. A disposable filter assembly in accordance with claim 1, in which the housing is of plastic material.

10. A disposable filter assembly in accordance with claim 9, in which the plastic material is a thermoplastic resin.

11. A disposable filter assembly in accordance with claim 10, in which the thermoplastic resin is polypropylene.

12. A disposable filter assembly in accordance with claim 1, in which the housing is formed in two cooperating sections, each section including one end and one fluid port of the housing, and defining a portion of the opposed outer side walls, with the side wall portions terminating in mating ribbed flanges, the sections being attached together at the mating flanges, thereby completing the side walls and forming a one-piece housing.

13. A disposable filter assembly in accordance with claim 12, in which inner side walls are on one housing section, and the filter element is held at opposed side portions between the inner side walls and one end of the other housing section.

14. A disposable filter assembly in accordance with claim 13, in which the filter element is held to the housing sections in a bite between ribs on the flanges thereof.

15. A disposable filter assembly in accordance with claim 12, in which the two housing sections and the side caps are potted together to form an integral one-piece filter assembly.

16. A disposable filter assembly in accordance with claim 12, in which the three comb means are evenly spaced with one comb means at each end and one approximately equidistant from each end of each housing portion.

* * * * *